(12) United States Patent
Ohtsuka et al.

(10) Patent No.: US 11,421,862 B2
(45) Date of Patent: Aug. 23, 2022

(54) ILLUMINATION LAMP AND FRAME-LIKE BODY OF ILLUMINATION LAMP

(71) Applicant: Yazaki Corporation, Tokyo (JP)

(72) Inventors: Haruhito Ohtsuka, Shizuoka (JP); Ryohei Ochiai, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/206,981

(22) Filed: Mar. 19, 2021

(65) Prior Publication Data
US 2021/0293398 A1 Sep. 23, 2021

(30) Foreign Application Priority Data
Mar. 23, 2020 (JP) .............................. JP2020-051404

(51) Int. Cl.
*F21V 21/00* (2006.01)
*F21V 17/16* (2006.01)
*B60Q 3/51* (2017.01)
*F21V 21/04* (2006.01)

(52) U.S. Cl.
CPC ................ *F21V 21/00* (2013.01); *B60Q 3/51* (2017.02); *F21V 17/16* (2013.01); *F21V 21/041* (2013.01)

(58) Field of Classification Search
CPC .... F21V 17/16; F21V 231/044; F21V 21/041; F21V 21/04; F21V 21/044; B60Q 3/51; B60Q 3/54
USPC ................................ 362/479, 365, 148, 147
See application file for complete search history.

(56) References Cited

U.S. PATENT DOCUMENTS

| 5,239,449 | A | * | 8/1993 | Wnuk | ...................... B60Q 3/51 362/490 |
| 6,364,512 | B1 | * | 4/2002 | Logel | ...................... F21V 21/04 362/396 |
| 8,079,727 | B2 | * | 12/2011 | Liang | ...................... F21V 21/04 362/147 |
| 2002/0041496 | A1 | * | 4/2002 | Hatagishi | .................. B60Q 3/82 362/490 |
| 2018/0334095 | A1 | | 11/2018 | Ohtsuka | |
| 2021/0291728 | A1 | * | 9/2021 | Ohtsuka | .................... B60Q 3/60 |

FOREIGN PATENT DOCUMENTS

| EP | 1283131 A2 * | 2/2003 | .......... B60Q 3/0203 |
| JP | 2005-75219 A | 3/2005 | |
| JP | 2012-166690 A | 9/2012 | |
| JP | 2018-192881 A | 12/2018 | |

* cited by examiner

*Primary Examiner* — Laura K Tso
(74) *Attorney, Agent, or Firm* — Sughrue Mion, PLLC

(57) ABSTRACT

The present application has a first engagement part that is provided at a first end and that engages with a plate-like member by holding the plate-like member from both sides at a first edge portion of a through-hole in the plate-like member; and a second engagement part that is provided at a second end and that engages with the plate-like member by holding the plate-like member from both sides at a second edge portion of the through-hole in the plate-like member.

4 Claims, 12 Drawing Sheets

FIG. 1
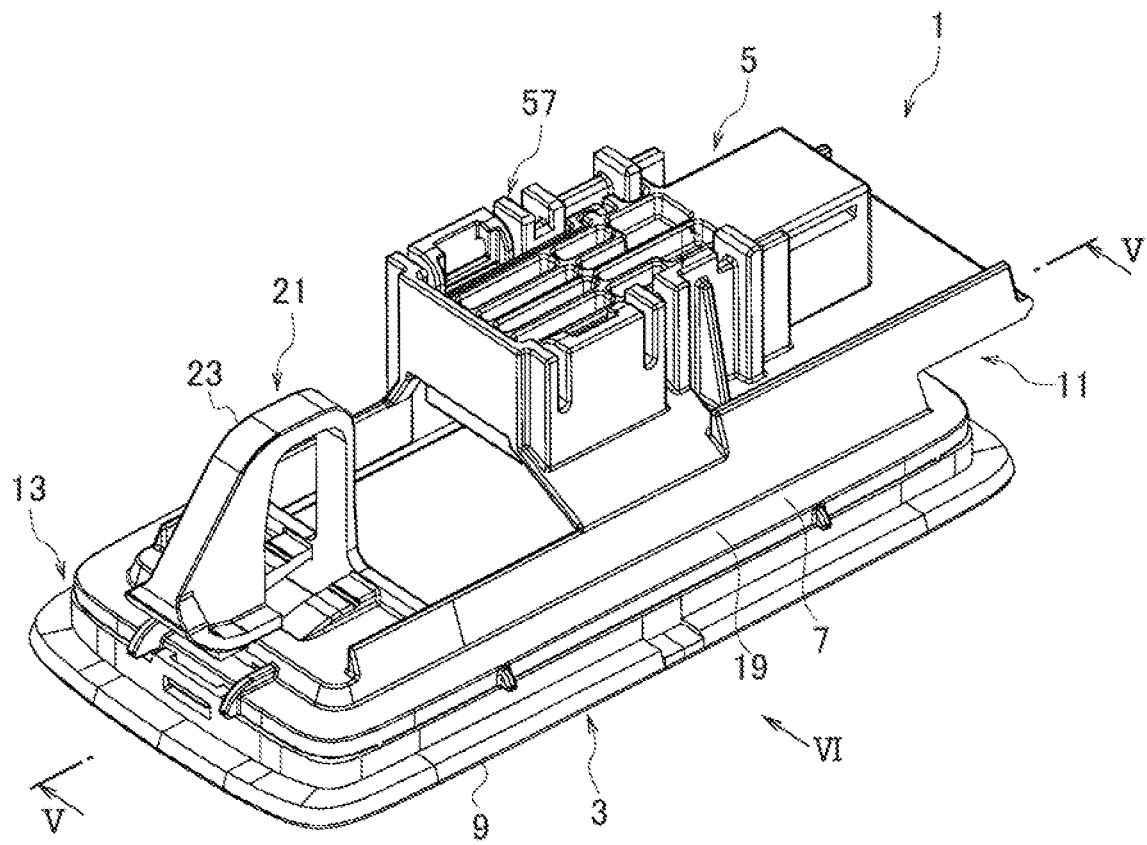
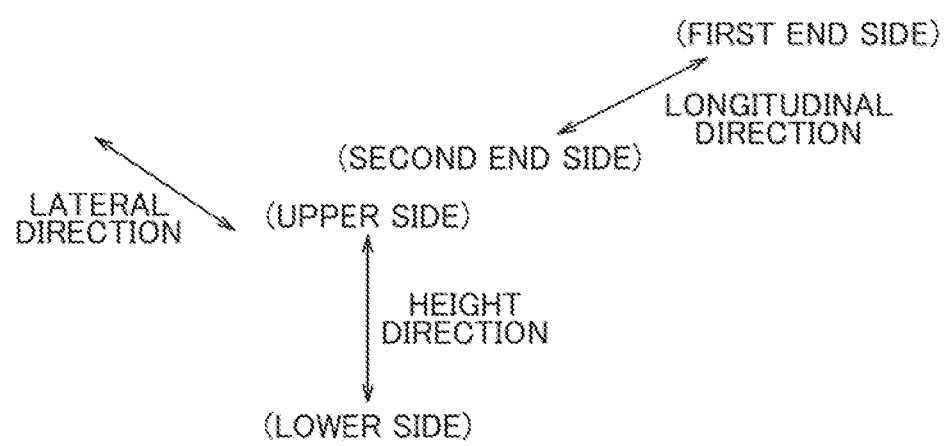

ILLUMINATION LAMP AND FRAME-LIKE BODY OF ILLUMINATION LAMP

CROSS-REFERENCE TO RELATED APPLICATIONS

The present application is based on, and claims priority from Japanese Patent Application No. 2020-051404, filed on Mar. 23, 2020, the entire contents of which are incorporated herein by reference.

TECHNICAL FIELD

The present application relates to an illumination lamp and a frame-like body of an illumination lamp.

BACKGROUND

An illumination lamp of JP 2005-75219 A is provided with a function part and a design part and is fixed to a through-hole which is an opening in a ceiling panel constituting interior material of a vehicle.

SUMMARY

Nevertheless, in the case of the illumination lamp of JP 2005-75219 A, when an unexpected force acts on the function part due to wiring that extends from a connector fixed to the function part being pulled, or similar, there is a risk of the function part slipping out of the frame-like body (the bezel). When the function part slips out of the frame-like body (the bezel), there is a risk of the design part and the function part slipping out of the ceiling panel and of the design part falling.

An object of the present application is to provide an illumination lamp and a frame-like body (a bezel) for an illumination lamp which, in a state of being fixed to a through-hole in a plate-like member such as a ceiling panel, are capable of maintaining the state of being fixed to the plate-like member even if a function part slips out of the frame-like body (the bezel).

The frame-like body of an illumination lamp according to the embodiment has a first engagement part that is provided at a first end and that engages with a plate-like member due to a first edge portion of a through-hole in the plate-like member being inserted, and a second engagement part that is provided at a second end and that engages with the plate-like member due to a second edge portion of the through-hole in the plate-like member being inserted.

Furthermore, in the case of the frame-like body of an illumination lamp according to the embodiment, the first engagement part is configured provided with a first engagement-part first contact portion that protrudes from a first end which is one end of the frame-like body main-body portion and makes contact with a first surface of the plate-like member; and a first engagement-part second contact portion that protrudes further than the first engagement-part first contact portion from the first end of the frame-like body main-body portion and that makes contact with a second surface of the plate-like member.

In addition, for the frame-like body of an illumination lamp according to the present embodiment, the value of the distance between the first engagement-part first contact portion and the first engagement-part second contact portion is a constant value at the proximal end of the first engagement-part first contact portion, and at the distal end of the first engagement-part first contact portion, the value gradually increases as the separation increases in the direction in which the first engagement-part first contact portion protrudes from the frame-like body main-body portion.

Furthermore, in the case of the frame-like body of an illumination lamp according to the embodiment, the second engagement part is configured provided with a snap-fit.

Further, in the case of the frame-like body of the illumination lamp according to the embodiment, the second engagement part is configured provided with the snap-fit, and a second engagement-part first contact portion that makes contact with the first surface of the plate-like member, and the snap-fit is configured provided with an arm part that has elasticity, and a second engagement-part second contact portion that is provided at the distal end of the arm part and that makes contact with the second surface of the plate-like member.

Furthermore, the illumination lamp according to the embodiment has a function part that emits light; and a design part configured provided with a frame-like body of the illumination lamp, and a lens that is fixed to the frame-like body of the illumination lamp, the design part having the function part fixed thereto.

The foregoing configuration affords the advantageous effect of making it possible to provide an illumination lamp and a frame-like body (a bezel) of an illumination lamp which, in a state of being fixed to a through-hole in a plate-like member such as a ceiling panel, are capable of maintaining the state of being fixed to the plate-like member even if a function part slips out of the frame-like body (the bezel).

BRIEF DESCRIPTION OF THE DRAWINGS

FIG. 1 is a perspective view of an illumination lamp according to an embodiment of the present application;

DETAILED DESCRIPTION

Various embodiments will be described hereinafter with reference to the accompanying drawings.

Figure 2:
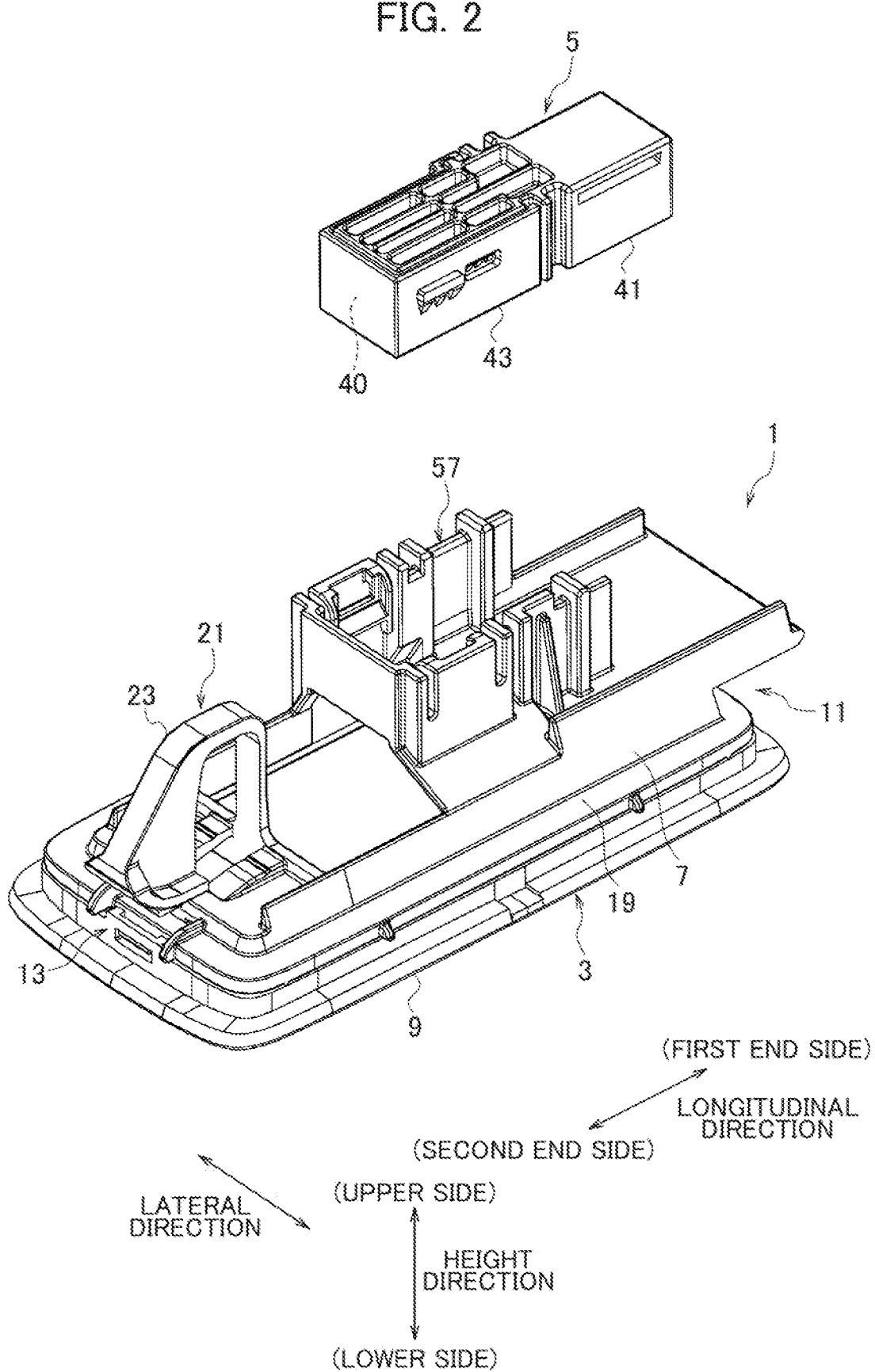
FIG. 2 is a perspective view of the illumination lamp according to the embodiment of the present application and illustrates a state in which a function part has been removed from a design part.
Figure 3:
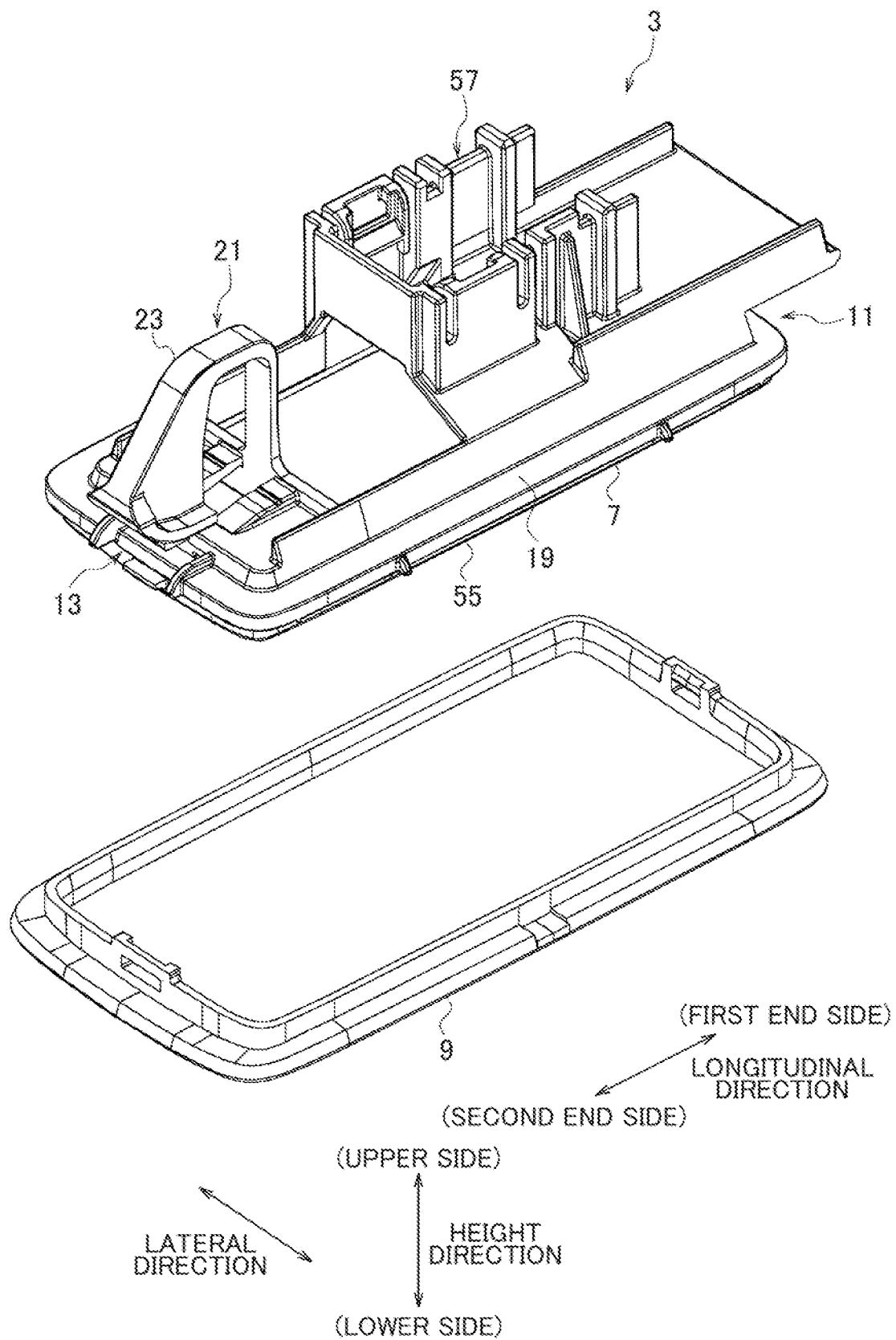
FIG. 3 is an exploded perspective view of the design part of the illumination lamp according to the embodiment of the present application.

An illumination lamp 1 according to the embodiment of the present application is used as an interior light of a vehicle, for example, and as illustrated in FIGS. 1 to 3, and so forth, is configured provided with a design part (design body) 3 and a function part (function body) 5. The design part 3 is configured provided with a frame-like body (a bezel) 7 and a lens (lens part) 9. The frame-like body 7 is integrally molded from a synthetic resin, for example. The lens 9 is also integrally molded from a synthetic resin, for example.

To facilitate the explanation, one predetermined direction is the longitudinal direction of the illumination lamp and the like, another predetermined direction orthogonal to the longitudinal direction is the lateral direction thereof, and a direction orthogonal to the longitudinal and lateral directions is the height direction thereof. Although the height direction is sometimes a vertical direction, the height direction is not limited to only a vertical direction.

A frame-like body 7 is provided with a first engagement part (first fixing part) 11 and a second engagement part (second fixing part) 13. The first engagement part 11 is provided at a first end of the frame-like body 7 which is one end in the longitudinal direction. The second engagement part 13 is provided at a second end of the frame-like body 7 which is the other end in the longitudinal direction.

Figure 5:
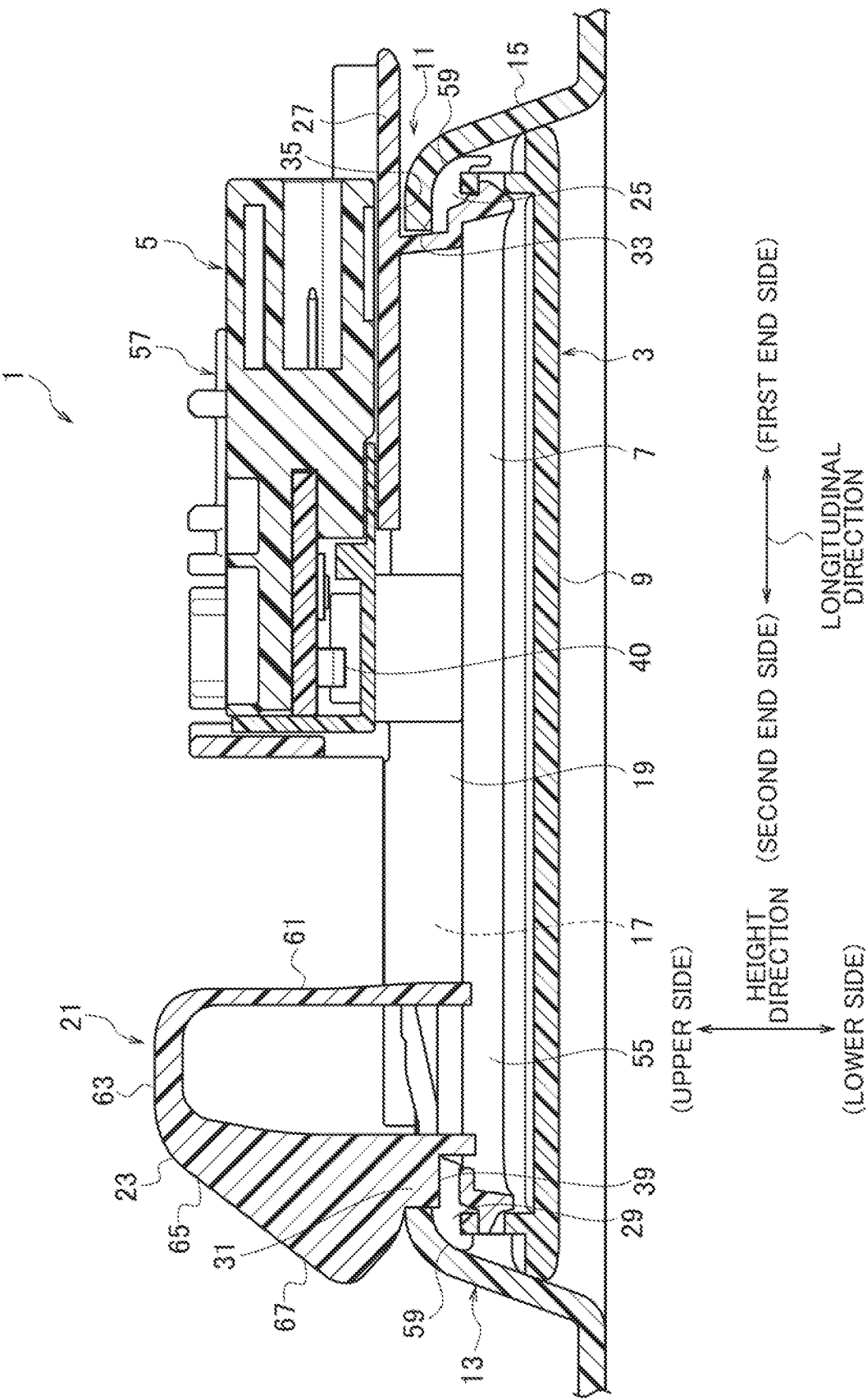
FIG. 5 is a cross-sectional view along V-V in FIG. 1.

As illustrated in FIG. 5 and so forth, due to a plate-like member (a vehicle ceiling panel, for example) 15 being inserted into the first engagement part 11 and the second engagement part 13, the frame-like body 7 is fixed to the plate-like member 15.

To explain this more fully, there is a through-hole 17 of a predetermined shape in the plate-like member 15. Because part of the plate-like member 15 is inserted into the first engagement part 11, the first engagement part 11 holds the plate-like member 15 from both sides in the thickness direction at a first edge portion thereof, which is one edge portion of the through-hole 17 in the longitudinal direction (the edge portion at the first end side in the longitudinal direction). Because part of the plate-like member 15 is inserted into the second engagement part 13, the second engagement part 13 holds the plate-like member 15 from both sides in a thickness direction at a second edge portion thereof, which is the other edge portion of the through-hole 17 in the longitudinal direction (the edge portion at the second end side in the longitudinal direction).

The frame-like body 7 is configured provided with a frame-like body main-body portion 19, and the direction in which the first engagement part 11 holds the plate-like member 15 from both sides and the direction in which the second engagement part 13 holds the plate-like member 15 from both sides are the height direction and these directions coincide with each other. Furthermore, when the first engagement part 11 and the second engagement part 13 simultaneously engage with the plate-like member 15, the frame-like body 7 of the illumination lamp 1 enters the through-hole 17 and is fixed to the plate-like member 15 so as to block the through-hole 17.

The second engagement part 13 is configured provided with a snap-fit 21 at the upper side (top) in the height direction in order to facilitate the fixing of frame-like body 7 to the plate-like member 15.

When the frame-like body 7 is fixed to the plate-like member 15, the first engagement part 11 of the frame-like body 7 is first made to engage with the plate-like member 15, whereupon the second engagement part 13 of the frame-like body 7 is made to engage with the plate-like member 15.

In a state where the second engagement part 13 of the frame-like body 7 is being fixed to the plate-like member 15, an arm part 23, which constitutes the snap-fit 21, is elastically deformed. When the frame-like body 7 has been fixed to the plate-like member 15, the first engagement part 11 of the frame-like body 7 engages with the plate-like member 15, the arm part 23 constituting the snap-fit 21 is restored, and the second engagement part 13 engages with the plate-like member 15.

The first engagement part 11 is configured provided with a first engagement-part first contact portion 25 and a first engagement-part second contact portion 27. The first engagement-part first contact portion 25 makes contact with a first surface (the lower surface in the height direction, for example), which is one surface of the plate-like member 15 in the thickness direction (height direction) thereof. The first engagement-part second contact portion 27 makes contact with a second surface (the upper surface in the height direction, for example), which is the other surface of the plate-like member 15 in the thickness direction thereof.

Note that the configuration may also be such that the first engagement-part second contact portion 27 and the upper surface of the plate-like member 15 face each other at a slight gap.

The second engagement part 13 is configured provided with the snap-fit 21 and a second engagement-pan first contact portion 29. The second engagement-part first contact portion 29 makes contact with a first surface (the lower surface in the height direction, for example), which is one surface of the plate-like member 15 in the thickness direction (height direction) thereof.

The snap-fit 21 is configured provided with an arm part 23 having elasticity and a second engagement-part second contact portion 31. The arm part 23 has elasticity and is formed in the shape of a bent cantilever beam. The second engagement-part second contact portion 31 is provided at the distal end of the arm part 23 and makes contact with a second surface (the upper surface, for example), which is the other surface of the plate-like member 15 in the thickness direction.

Note that the configuration may also be such that the second engagement-part second contact portion 31 and the upper surface of the plate-like member 15 face each other at a slight gap.

Figure 8A:
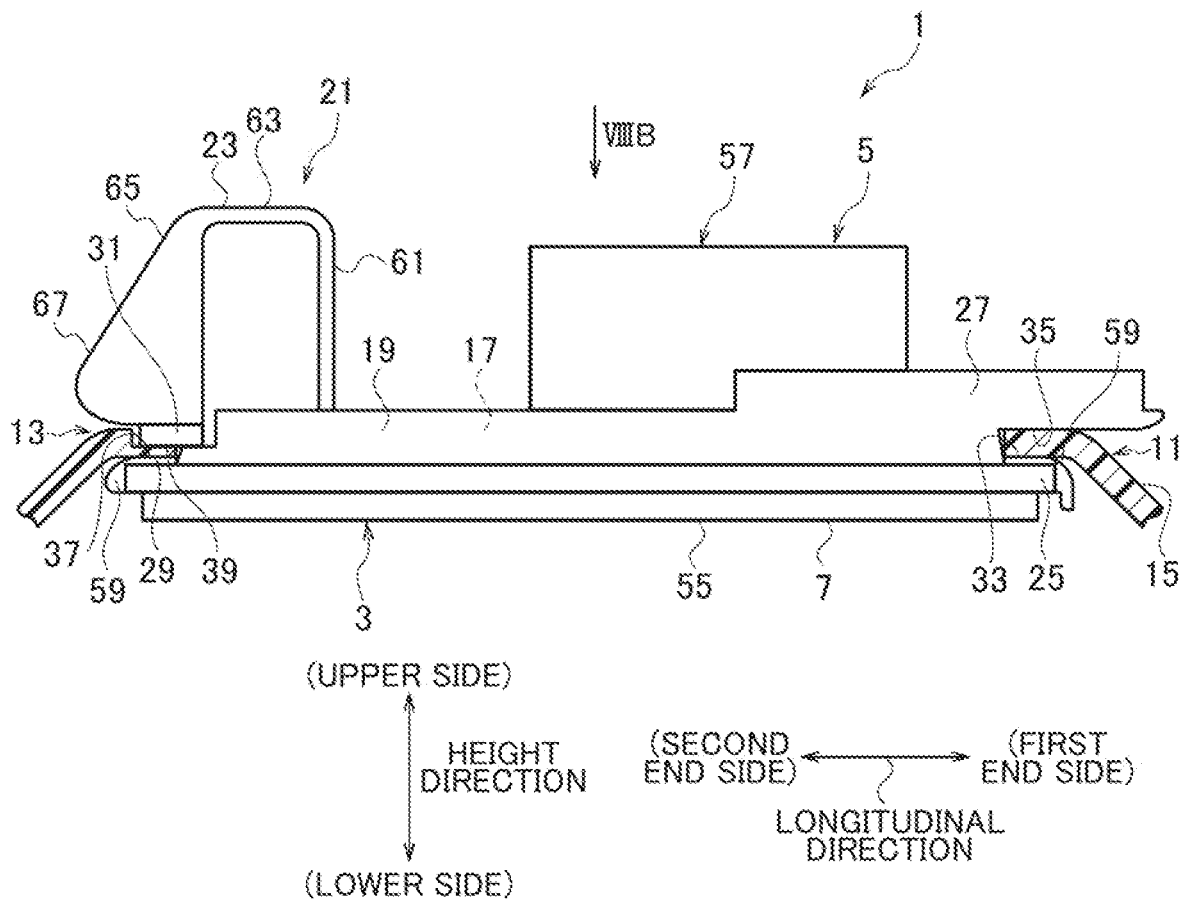
FIG. 8A is a diagram corresponding to FIG. 5 and in which the illumination lamp according to the embodiment of the present application is represented in a slightly simplified manner.

As illustrated in FIG. 8A and so forth, the first engagement-part first contact portion 25 protrudes by a predetermined length in the longitudinal direction from the first end of the frame-like body main-body portion 19. The planar upper surface of the first engagement-part first contact portion 25 is a first engagement-part first contact surface 33 that makes contact with the lower surface of the plate-like member 15. The first engagement-part second contact portion 27 protrudes by a predetermined length in the longitudinal direction from the first end of the frame-like body main-body portion 19. The planar lower surface of the first engagement-part second contact portion 27 is a first engagement-part second contact surface 35 that makes contact with the upper surface of the plate-like member 15.

The second engagement-part first contact portion 29 protrudes by a predetermined length in the longitudinal direction from the second end of the frame-like body main-body portion 19. The upper surface of the second engagement-part first contact portion 29 is the second engagement-part first contact surface 37 that makes contact with the lower surface of the plate-like member 15. The lower surface of the second engagement-part second contact portion 31 of the snap-fit 21 is a second engagement-part second contact surface 39 that makes surface contact with the upper surface of the plate-like member 15.

The value of the protrusion length from the frame-like body main-body portion 19 of the first engagement-part second contact portion 27 is greater than the value of the protrusion length from the frame-like body main-body portion 19 of the first engagement-part first contact portion 25.

To explain this more fully, the first engagement part 11 protrudes from a first end which is one end of the frame-like body main-body portion 19 in the longitudinal direction thereof and is configured provided with the first engagement-part first contact portion 25 and the first engagement-part second contact portion 27. The first engagement-part first contact portion 25 makes contact with the first surface (lower surface) of the plate-like member 15. The first engagement-part second contact portion 27 protrudes further than the first engagement-part first contact portion 25 from the first end of the frame-like body main-body portion 19 in the longitudinal direction thereof and makes contact with the second surface (upper surface) of the plate-like member 15.

The portion of the first engagement-part first contact portion 25 which makes contact with the first surface (lower surface) of the plate-like member 15 is a flat surface that is orthogonal to the height direction. The portion of the first engagement-part second contact portion 27 which makes contact with the second surface (upper surface) of the plate-like member is a flat surface that is orthogonal to the height direction. The flat surface of the first engagement-part first contact portion 25 and the flat surface of the first engagement-part second contact portion 27 are spaced apart by a predetermined distance in the height direction.

The value of the distance between the flat surface of the first engagement-part first contact portion 25 and the flat surface of the first engagement-part second contact portion 27 is substantially equal to the value of the thickness dimension of the plate-like member 15 at the first edge portion of the through-hole 17. That is, the value of the distance between the flat surface of the first engagement-part first contact portion 25 and the flat surface of the first engagement-part second contact portion 27 is slighter larger than, equal to, or slightly smaller than the value of the thickness dimension of the plate-like member 15.

The first engagement-part first contact portion 25 is configured from a proximal end and a distal end. The value of the distance in the height direction between the first engagement-part first contact portion 25 and the first engagement-part second contact portion 27 is a constant value at the proximal end of the first engagement-part first contact portion 25 and substantially equal to the value of the thickness dimension of the plate-like member 15. The value of the distance in the height direction between the first engagement-part first contact portion 25 and the first engagement-part second contact portion 27 gradually increases, at the distal, end of the first engagement-part first contact portion 25, as the separation increases in the direction in which the first engagement-part first contact portion 25 protrudes, which is the direction of movement toward the first end of the frame-like body main-body portion 19 in the longitudinal direction.

The proximal end of the fast engagement-part first contact portion 25 is a portion on the frame-like body main-body portion 19 side, and the distal end of the first engagement-part first contact portion 25 is a portion on the opposite side from the frame-like body main-body portion 19. The proximal end of the first engagement-part first contact portion 25 protrudes a predetermined length from the first end of the frame-like body main-body portion 19 in the longitudinal direction, and the distal end of the first engagement-part first contact portion 25 protrudes a predetermined length from the proximal end of the first engagement-part first contact portion 25. The flat surface of the first engagement-part first contact portion 25 which makes contact with the first surface (lower surface) of the plate-like member 15 is formed at the proximal end of the first engagement-part first contact portion 25.

Figure 4:
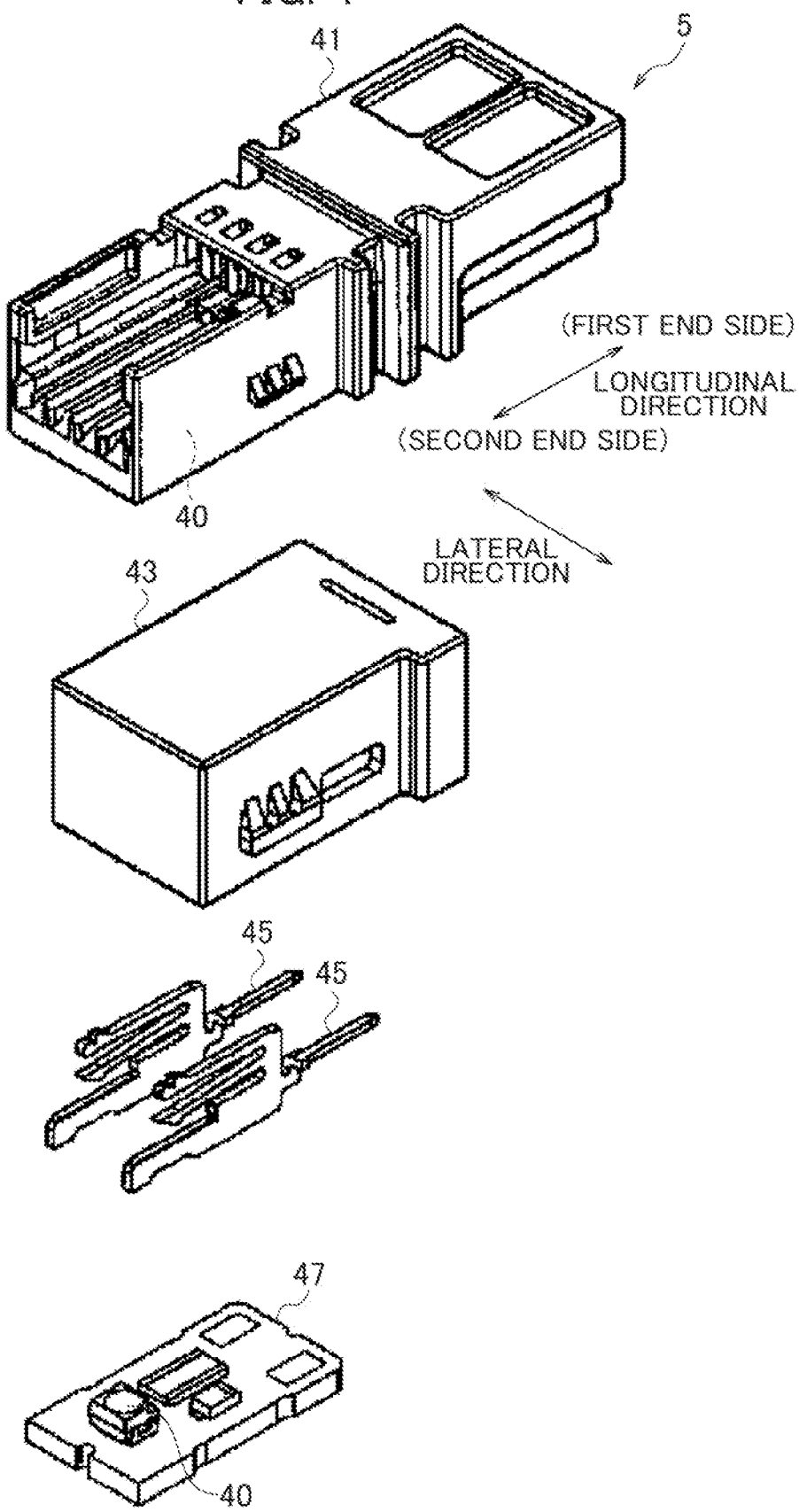
FIG. 4 is an exploded perspective view of the function part of the illumination lamp according to the embodiment of the present application.

As illustrated in FIG. 4 and so forth, a light emission unit 40 that emits light is provided to the function part 5 of the illumination lamp 1. The light emission unit 40 has an LED, for example, as its light source. As illustrated in FIG. 1 and so forth, the lens 9 of the illumination lamp 1 is integrally fixed to the frame-like body 7 on the lower side of the frame-like body 7. The function part 5 of the illumination lamp 1 is integrally fixed to the frame-like body 7 on the upper side of the frame-like body 7.

In the illumination lamp 1, the function part 5 is separate from the design part 3, as illustrated in FIG. 2 and so forth. The function part 5 can be easily fixed to the design part 3. The illumination lamp 1, in which the function part 5 and design part 3 are integrally configured as a result of the frame-like body 7 of the illumination lamp 1 being fixed to a through-hole 17 of a predetermined shape which is formed in the plate-like member 15, is integrally fixed to the plate-like member 15. In this case, the function part 5 is positioned on the upper side of the plate-like member 15, the lens 9 is positioned on the lower side of the plate-like member 15, and light emitted by the function part 5 passes through the lens 9 so as to be radiated into the interior of the vehicle which is a space below the plate-like member 15.

The illumination lamp 1 is described in further detail below.

As illustrated in FIG. 4, the function part 5 is configured provided with a housing 41, a cover 43, a bus bar 45, and a circuit substrate 47. The cover 43, the bus bar 45, and the circuit substrate 47 are integrally fixed to the housing 41, thereby forming the function part 5. The external shape of the function part 5 is formed as a rectangular parallelepiped shape.

Figure 6:
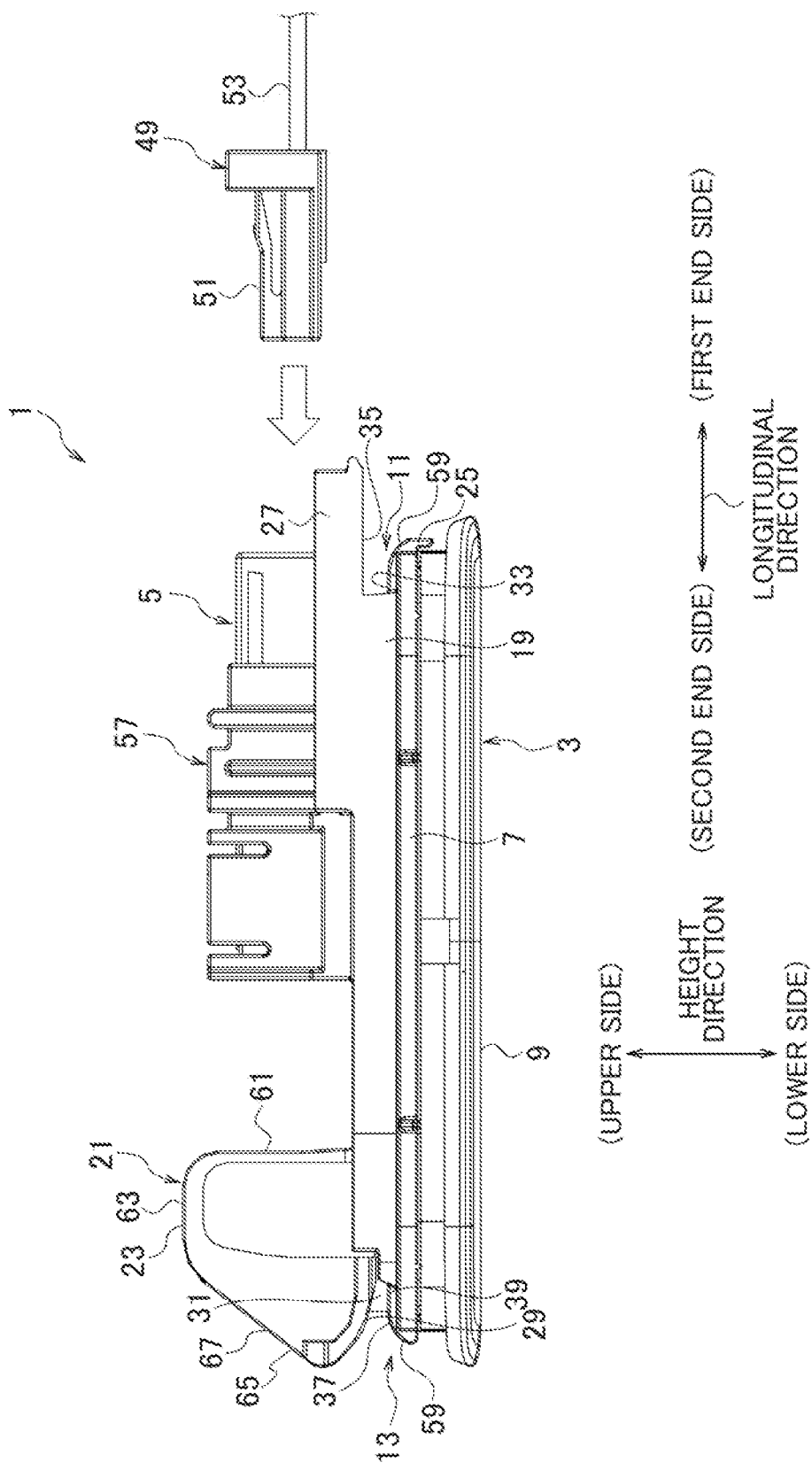
FIG. 6 is a diagram illustrating an arrow view along VI in FIG. 1 and illustrating a state prior to fixing a connector.

The housing 41 is integrally molded from a synthetic resin, for example. The cover 43 is also integrally molded from a synthetic resin, for example. The cover 43 is configured from a transparent or a semi-transparent material through which light emitted by the light emission unit 40 passes. As illustrated in FIG. 6 and so forth, a connector body portion 51 of a connector 49 is fixed to a first end which is one end of the housing 41 in the longitudinal direction. Wiring 53 extends from the connector body portion 51. As illustrated in FIG. 4 and so thrift, the light emission unit 40 is provided on the circuit substrate 47.

As illustrated in FIGS. 3 and 5, and so forth, the frame-like body 7 is configured provided with a rectangular ring-shaped frame-like body main-body portion 19 with a small height-dimension value, a rectangular ring-shaped lower end 55 with a small height-dimension value, a function part fixing portion 57, and a snap-fit 21. The dimensional values of the frame-like body main-body portion 19 in the longitudinal and lateral directions are smaller than the dimensional values of the lower end 55 in the longitudinal and lateral directions. In the height direction, the frame-like body main-body portion 19 is arranged at the top of the lower end 55. When viewed in the height direction, the frame-like body main-body portion 19 is positioned on the inside of the lower end 55. The function part fixing portion 57 is arranged at the top of the frame-like body main-body portion 19, as illustrated in FIG. 5 and so forth.

The first engagement-part second contact portion 27 is formed with a rectangular flat plate shape, for example, and protrudes, such that the thickness direction thereof is the height direction, from the first end of the frame-like body main-body portion 19 in the longitudinal direction, at the top of the frame-like body main-body portion 19. The rectangular, flat surface (lower surface) of the first engagement-part second contact portion 27 is the first engagement-part second contact surface 35.

Figure 8B:
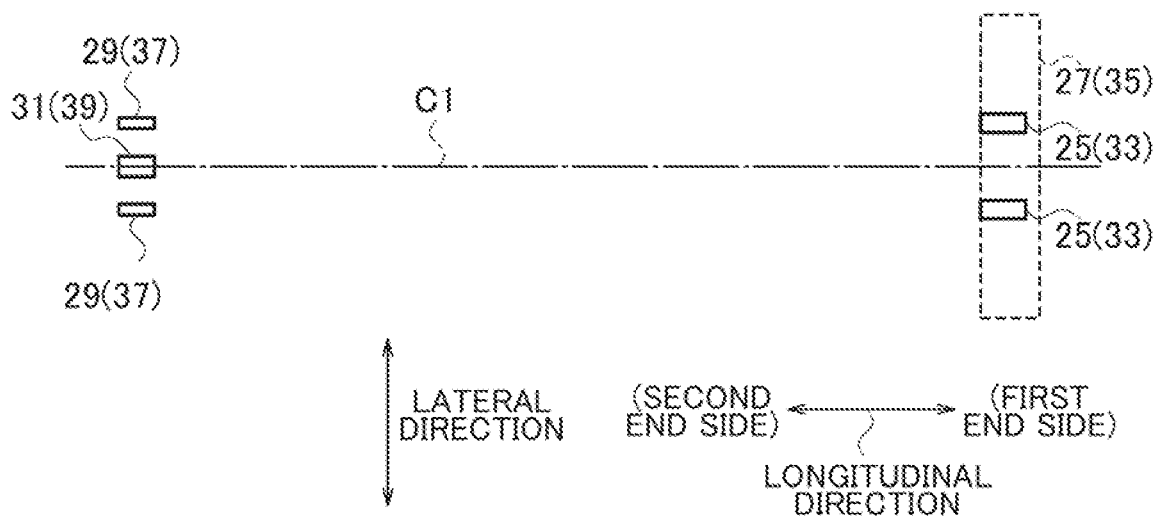
FIG. 8B is an arrow diagram along VIIIB in FIG. 8A and illustrating contact surfaces between a plate-like member and a frame-like body.

The first engagement-part first contact portion 25 is provided as a pair, for example, as illustrated in FIG. 8B. When viewed in the height direction, the pair of first engagement-part first contact portions 25 are spaced apart by a predetermined gap in the lateral direction. Furthermore, when viewed in the height direction, the pair of first engagement-pan first contact portions 25 (first engagement-part first contact surfaces 33) are arranged on the inside of the first engagement-pan second contact portion 27 (the first engagement-part second contact surface 35). Details of the first engagement-part first contact surfaces 33 are provided next.

The first engagement-part first contact portions 25 are configured provided with the first engagement-part first contact surface 33, which is formed from a small rectangle-shaped flat surface, and an arc-shaped guide surface 59. The first engagement-part first contact surfaces 33 protrude from the first end of the frame-like body main-body portion 19 in the longitudinal direction thereof on the lower side of the frame-like body main-body portion 19. The arc-shaped guide surfaces 59 protrude from the first engagement-part first contact surfaces 33 in the longitudinal direction.

The value of the lateral dimension (width dimension) of the first engagement-part first contact surfaces 33 and the value of the lateral dimension (width dimension) of the arc-shaped guide surfaces 59 coincide with one another. Further, in the lateral direction, the positions of the first engagement-part first contact surfaces 33 and the positions of the arc-shaped guide surfaces 59 coincide with one another.

When viewed in a lateral direction, the first engagement-part first contact surfaces 33 are parallel to the first engagement-part second contact surface 35, as illustrated in FIG. 5A. The arc-shaped guide surfaces 59 are formed in a one-quarter arc shape. The arc-shaped guide surfaces 59 do not bend suddenly relative to the first engagement-part first contact surfaces 33 but, rather, connect smoothly so as to be contiguous with the first engagement-part first contact surfaces 33. Thus, as mentioned earlier, the first engagement-part first contact portions 25 are configured from a proximal end and a distal end. Furthermore, due to the arc-shaped guide surfaces 59, which are formed facing downward in the height direction, the value of the distance in the height direction between the first engagement-pan first contact portion 25 and the first engagement-part second contact portion 27 gradually increases, at the distal end of the first engagement-part first contact portion 25, as the separation increases in the direction in which the first engagement-part first contact portion 25 protrudes, which is the direction of movement toward the first end of the frame-like body main-body portion 19 in the longitudinal direction.

Furthermore, the value of the distance in the height direction between the first engagement-part second contact surface 35 and the arc-shaped guide surface 59 gradually increases as the separation increases in the direction in which the first engagement-part first contact portion 25 protrudes. In addition, although the guide surface 59 is naturally arc-shaped, the ratio of separation in the height direction of the arc-shaped guide surface 59 from the first engagement-part second contact surface 35 also gradually increases.

Note that, when viewed in the height direction, the frame-like body 7 has a in symmetrical shape relative to a center line C1 (see FIG. 8B) of the frame-like body 7, and the first engagement-part first contact portion 25 and the first engagement-part second contact portion 27 are symmetrically arranged relative to the center line C1.

The second engagement-part first contact portions 29 are configured provided with the second engagement-part first contact surface 37, which is formed from a small rectangle-shaped flat surface. The second engagement-part first contact surfaces 37 protrude from the second end of the frame-like body main-body portion 19 on the lower side of the frame-like body main-body portion 19. When viewed in a lateral direction, the second engagement-part first contact surfaces 37 exist in the same plane as the first engagement-part first contact surface 33 of the first engagement-part first contact portion 25, as illustrated in FIG. 8A. The second engagement-part first contact portions 29 are, like the first engagement-part first contact portions 25, also provided with the arc-shaped guide surface 59.

The second engagement-part first contact portion 29 is provided as a pair, for example, as illustrated in FIG. 8B. When viewed in the height direction, the pair of second engagement-part first contact portions 29 are spaced apart by a predetermined gap in the lateral direction. Furthermore, when viewed in the height direction, the second engagement-part first contact portions 29 are arranged symmetrically relative to the center line C1 of the frame-like body 7.

As illustrated in FIG. 5 and so forth, the snap-fit 21 is arranged at the second end of the frame-like body 7 in the longitudinal direction, and is arranged in the center of the frame-like body 7 in the lateral direction. The arm part 23 of the snap-fit 21 is configured provided with a first extension part 61, a second extension part 63, and a third extension part 65.

The first extension part 61 is a portion at the second end of the frame-like body main-body portion 19 in the longitudinal direction which extends upward in the height direction from the frame-like body main-body portion 19. The second extension part 63 extends toward the second end side in the longitudinal direction from the distal end (upper end) of the first extension part 61. The third extension part 65 extends downward from the distal end of the second extension part 63.

Furthermore, the third extension part 65 is formed in a triangular shape when viewed from a lateral direction. Thus, the dimensional value of the third extension part 65 in the longitudinal direction gradually increases in moving from top to bottom, and the third extension part 65 has an inclined surface 67. The inclined surface 67 faces the second end of the third extension part 65 in the longitudinal direction. The upper end of the inclined surface 67 is positioned at the first end side in the longitudinal direction, and the lower end of the inclined surface 67 is positioned at the second end side in the longitudinal direction.

When the frame-like body 7 (the illumination lamp 1) is fixed to the plate-like member 15, the arm part 23 is elastically deformed due to the inclined surface 67 making contact with the plate-like member 15 by forming a sliding pair therewith at the edge of the through-hole 17.

As illustrated in FIG. 8A and so forth, the second engagement-part second contact portion 31 is formed having a small rectangular parallelepiped shape, and protrudes slightly downward from the lower end of the third extension part 65 in the height direction. The second engagement-part second contact surface 39 is formed by the lower surface of the second engagement-part second contact portion 31. The second engagement-part second contact portion 31 (second engagement-part second contact surface 39) undergoes a slight change in position relative to the frame-like body main-body portion 19 in at least the height direction due to the arm part 23 being elastically deformed.

When viewed in the height direction, the second engagement-part second contact portion 31 (second engagement-part second contact surface 39) is arranged in the center in the lateral direction, as illustrated in FIG. 8B. Furthermore, when viewed in the height direction, the position of the second engagement-part second contact portion 31 (second engagement-part second contact surface 39) in the longitudinal direction and the position of the second engagement-part first contact portion 29 (second engagement-part first contact surface 37) in the longitudinal direction coincide with one another.

The following is an example of the assembly procedure for the illumination lamp 1.

Starting with the state illustrated in FIG. 4, the function part 5 is assembled by suitably fixing the circuit substrate 47, the bus bar 45, and the cover 43 to the housing 41. Thereafter, the function part 5 is fixed to the frame-like body 7, and the lens 9 is fixed thereto.

Next, the fixing of the illumination lamp 1 to a through-hole 17 in a panel (a ceiling panel, for example) 15 of a vehicle will be described.

In an initial state, the illumination lamp 1 is arranged on the lower side of the ceiling panel 15 such that the function part 5 is positioned on the upper side thereof and the lens 9 is positioned on the lower side thereof. In the initial state, the first end of the illumination lamp 1 in the longitudinal direction is positioned slightly higher than the second end thereof in the initial state, the wiring 53 of the connector 49 extends on the upper side of the ceiling panel 15 and passes through the through-hole 17 so as to extend by a slight length on the lower side of the ceiling panel 15. Furthermore, in the initial state, a connector body portion 51 is provided at the end of the wiring 53 that extends on the lower side of the ceiling panel 15.

In the initial state, the connector body portion 51 is fixed to the function part 5. Thereafter, the first end of the illumination lamp 1 (frame-like body 7) in the longitudinal direction is made to semi-engage (temporarily engage) with the ceiling panel 15 at the edge at the first end of the through-hole 17 in the ceiling panel 15 in the longitudinal direction (see FIG. 9).

Figure 9:
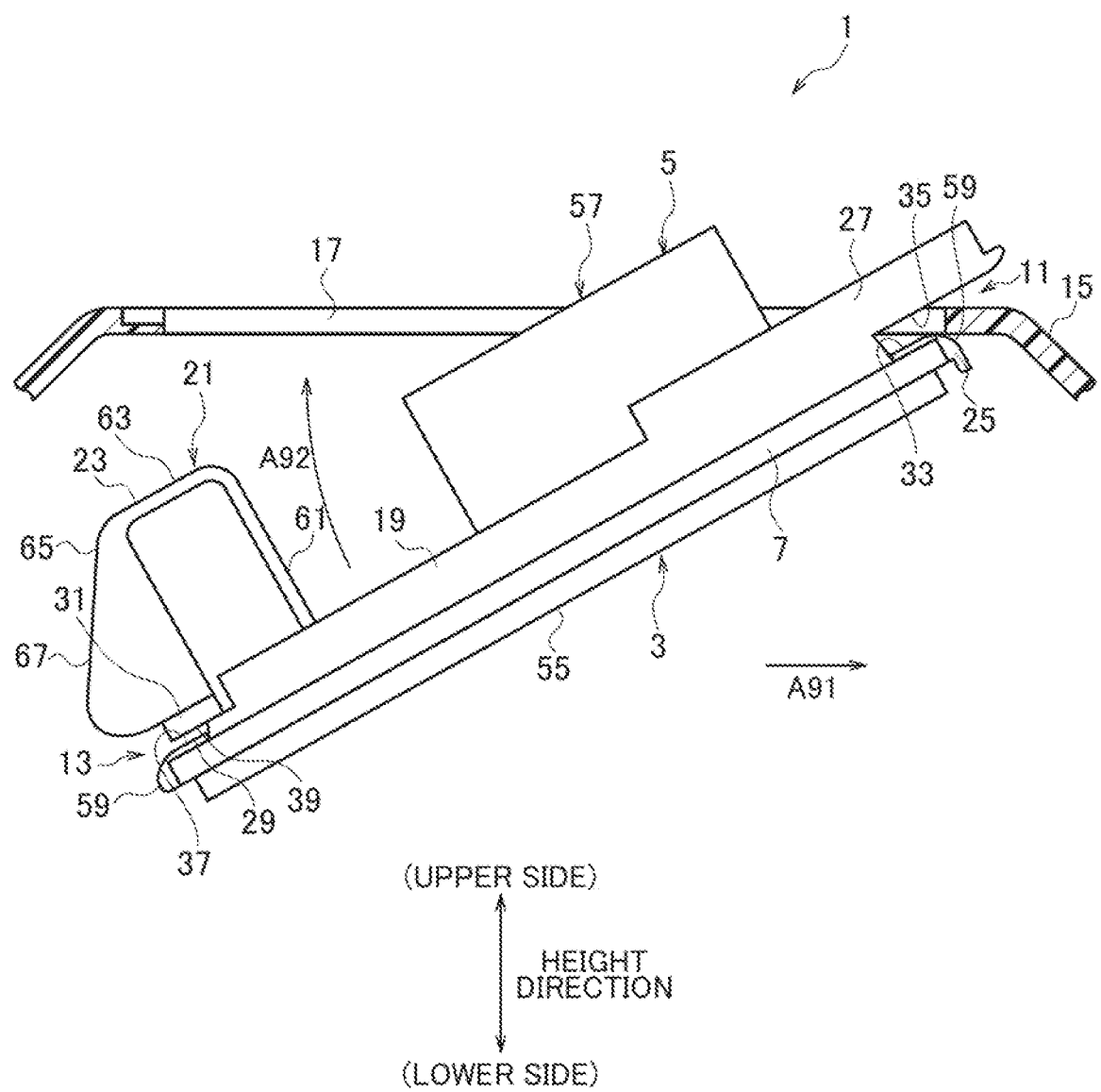
FIG. 9 is a diagram illustrating a midpoint state in which the illumination lamp according to the embodiment of the present application is being fixed to the plate-like member.

Thereafter, the illumination lamp 1 is moved slightly in the direction indicated by arrow A91 in FIG. 9, and, by using the portion of the illumination lamp 1 that is semi-engaged, as mentioned above, as the pivot center, the illumination lamp 1 is made to pivot (see arrow A92 in FIG. 9) such that the second end of the illumination lamp 1 in the longitudinal direction moves upward. This turning and so forth causes the snap-fit 21 (inclined surface 67) to make contact with the edge at the second end of the through-hole 17 in the ceiling panel 15 in the longitudinal direction and to be elastically deformed.

Turning the illumination lamp 1 further causes the snap-fit 21 to slip out from the edge of the through-hole 17 in the ceiling panel 15 and, as illustrated in FIGS. 5, 8A, and so forth, the snap-fit 21 is restored, thus terminating the fixing of the illumination lamp 1 to the ceiling panel 15 of the vehicle.

With the fixing terminated, the light emission unit 40 emits light due to power or the like being transmitted via the wiring 53. Further, the light emitted by the light emission unit 40 passes through the lens 9 so as to reach the vehicle cabin, thus illuminating the cabin.

The frame-like body 7 of the illumination lamp 1 is configured provided with a first engagement part 11 and a second engagement part 13. The first engagement part 11 engages with the plate-like member 15 by holding the plate-like member 15 from both sides at a first edge portion of the through-hole 17, which is of a predetermined shape, in the plate-like member 15. Furthermore, the second engagement part 13 engages with the plate-like member 15 by holding the plate-like member 15 from both sides at a second edge portion of the through-hole 17.

Figure 7:
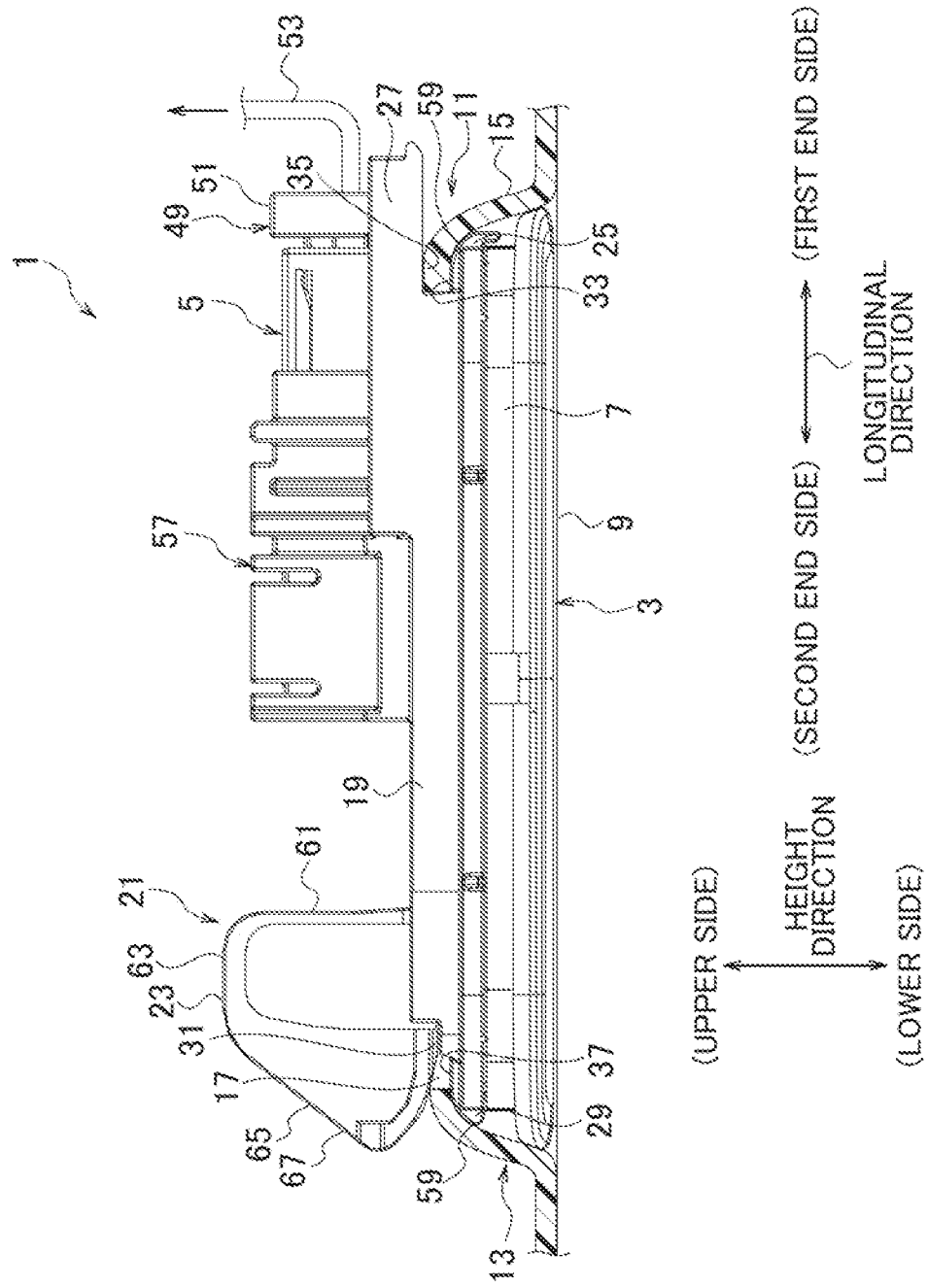
FIG. 7 is a diagram illustrating an arrow view along VI in FIG. 1 and illustrating a state where the connector has been fixed.

Due to the foregoing configuration, even when a force (see the arrow in FIG. 7) such as a force whereby the wiring 53 is pulled upward while the illumination lamp 1 is fixed to the plate-like member 15 is applied as illustrated in FIG. 7, a state where the frame-like body 7 is fixed to the plate-like member 15 can be maintained. That is, even if the function part 5 slips out of the frame-like body 7 due to the wiring 53 being pulled upward, a state where the frame-like body 7 is fixed to the plate-like member 15 can be maintained. Further, the design part 3 and the like can be prevented from falling from the plate-like member 15.

Figure 10:
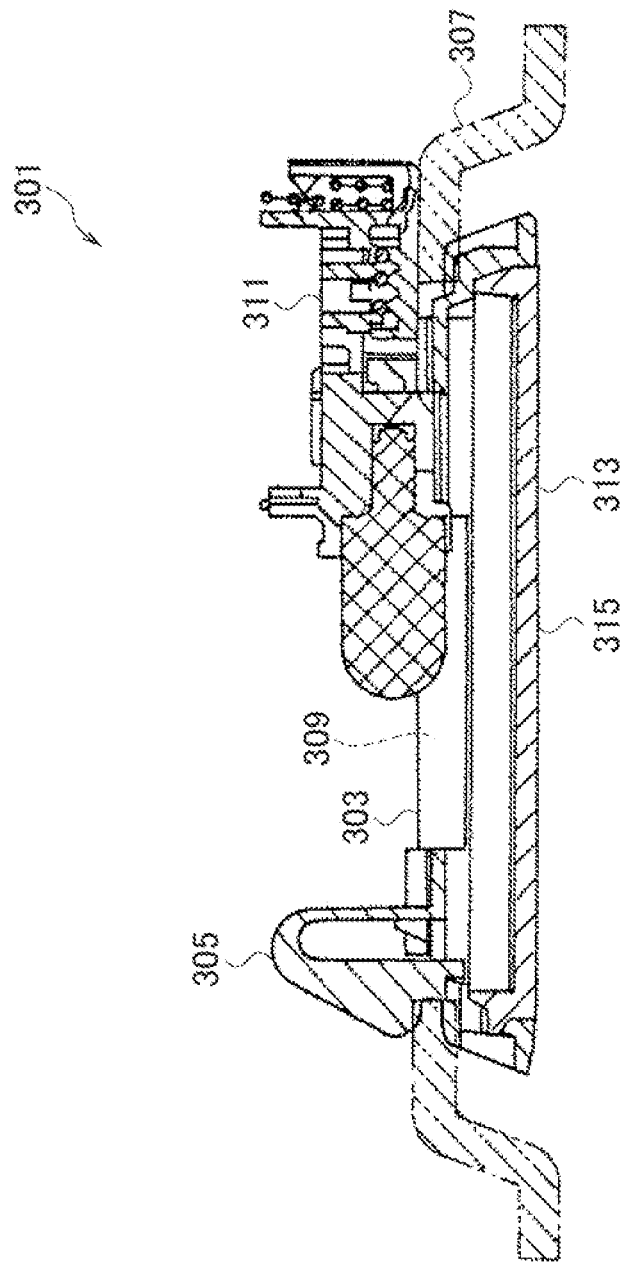
FIG. 10 is a diagram illustrating an illumination lamp according to a comparative example.

However, in the case of an illumination lamp 301 according to the comparative example as illustrated in FIG. 10, an edge portion close to a through-hole 309 in the ceiling panel 307 is held from both sides by a snap-fit 305 provided at the end of a bezel 303. Furthermore, in the illumination lamp 301 according to the comparative example, a function part 311 is fixed to a bezel 303, and an edge portion close to a through-hole 309 in a ceiling panel 307 is held from both sides by the end of the bezel 303 and the function part 311. Thus, a conventional illumination lamp 301 is fixed to a ceiling panel 307.

Figure 11:
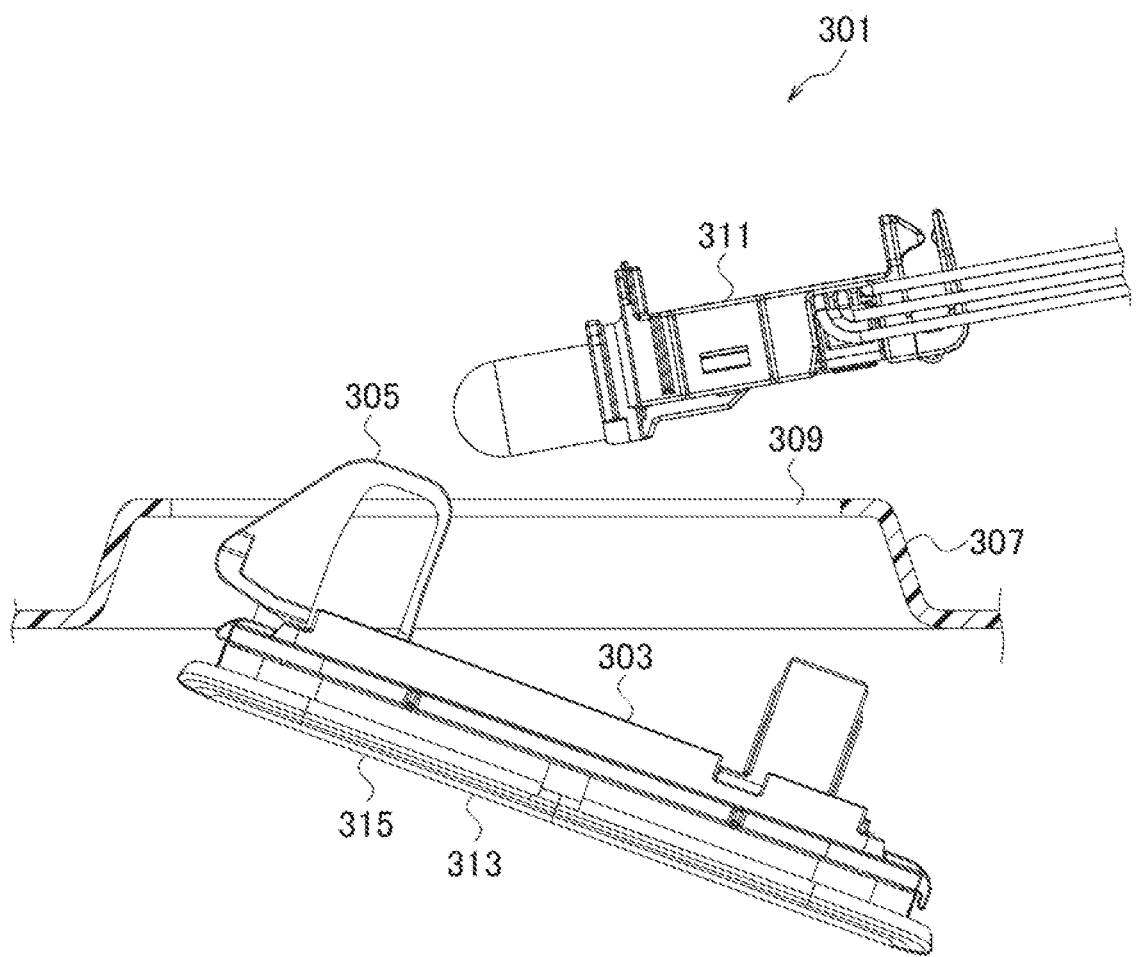
FIG. 11 is a diagram illustrating an illumination lamp according to a comparative example.

Therefore, in the case of the illumination lamp 301 according to the comparative example, when an unexpected force acts on the function part 311, there is a risk of the function part 311 slipping out of the bezel 303. When the function part 311 slips out of the bezel 303, the function part 311, and a design part 313 which is provided with the bezel 303 and a lens 315 then slip out of the ceiling panel 307, and there is a risk of the design part 313 falling, as illustrated in FIG. 11.

In contrast, in the case of illumination lamp 1, as mentioned earlier, because the design part 3 is fixed to the ceiling panel 15 without using the function part 5 and using only the bezel 7, even if the function part 5 slips out of the bezel 7, the design part 3 does not slip out of the ceiling panel 15 and does not fall.

According to the illumination lamp 1, because the second engagement part 13 is configured provided with the snap-fit 21, the snap-fit 21 is elastically deformed when the illumination lamp 1 is fixed to the ceiling panel 15, thereby facilitating the fixing of the illumination lamp 1 to the ceiling panel 15.

Furthermore, according to the illumination lamp 1, the first engagement part 11 is configured provided with the first engagement-part first contact portion 25 and the first engagement-part second contact portion 27, and the second engagement part 13 is configured provided with the snap-fit 21 and the second engagement-part first contact portion 29, thereby facilitating the fixing of the illumination lamp 1.

In other words, when the illumination lamp 1 is fixed to the plate-like member 15, in a state where the first end of the plate-like member 15 in the longitudinal direction is inserted between the first engagement-part first contact portion 25 and the first engagement-part second contact portion 27, the illumination lamp 1 is made to pivot by using the first end of the plate-like member 15 as a pivot center.

This turning causes the snap-fit 21 to make contact with the end of the plate-like member 15 and to be elastically deformed. When the illumination lamp 1 is turned further, the snap-fit 21 is restored beyond the plate-like member 15 such that the second end of the plate-like member 15 is held from both sides by the second engagement part 13. Further, the illumination lamp 1 is fixed to the plate-like member 15.

Therefore, it is possible to facilitate the fixing of the illumination lamp 1 to the plate-like member 15 by mainly turning the illumination lamp 1. As mentioned earlier, in a state where the illumination lamp 1 is fixed to the plate-like member 15, the plate-like member 15 is held from both sides by the first engagement-part first contact portion 25 and the first engagement-part second contact portion 27. Furthermore, in a state where the illumination lamp 1 is fixed to the plate-like member 15, the plate-like member 15 is held from both sides by the second engagement-part first contact portion 29 and the second engagement-part second contact portion 31 (the snap-fit 21).

In the illumination lamp 1, the first engagement-part second contact portion 27 protrudes further than the first engagement-part first contact portion 25. This configuration also facilitates the fixing of the illumination lamp 1 to the plate-like member 15. That is, when the illumination lamp 1 is fixed to the plate-like member 15, the first engagement-pan second contact portion 27 is inserted into the through-hole 17 in the plate-like member 15, and the illumination lamp 1 is made to turn and so forth. However, during such turning, because the first engagement-part second contact portion 27 is long, it is difficult for the illumination lamp 1 to slide from the plate-like member 15 (the through-hole 17).

In the illumination lamp 1, the value of the distance between the first engagement-part first contact portion 25 and the first engagement-part second contact portion 27 gradually increases, at the distal end of the first engagement-part first contact portion 25, as the separation increases in the direction in which the first engagement-part first contact portion 25 protrudes, which is the direction of movement toward the first end of the frame-like body main-body portion 19 in the longitudinal direction. This configuration also facilitates the fixing of the illumination lamp 1 to the plate-like member 15. That is, when the illumination lamp 1 is fixed to the plate-like member 15, the first engagement-part second contact portion 27 is inserted into the through-hole 17 in the plate-like member 15, and the illumination lamp 1 is made to turn and so forth. During this turning, the arc-shaped guide surface 59 of the distal, end of the first engagement-part second contact portion 27 makes contact with the plate-like member 15, thus facilitating the turning.

According to the illumination lamp 1, because the function part 5 is separate from the design part 3, maintenance is easy, and dealing with changes to specifications is also straightforward. That is, in the event of a malfunction in the function part 5 or the design part 3, the malfunctioning part alone may be exchanged, thus facilitating maintenance. Furthermore, when there is a change in specification such as a change in the shape of the design part 3, for example, the function part 5 may, be used as is and only the design part 3 may be changed, thus making changes in specification easy to deal with.

Figure 12A:
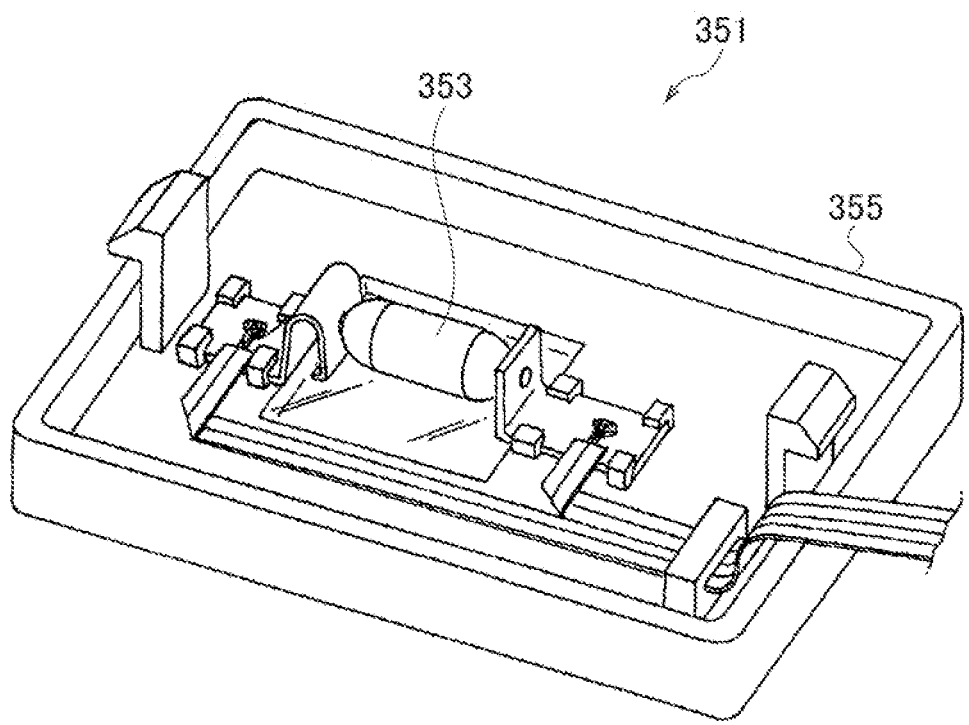
FIG. 12A is a diagram illustrating an illumination lamp according to a comparative example.
Figure 12B:
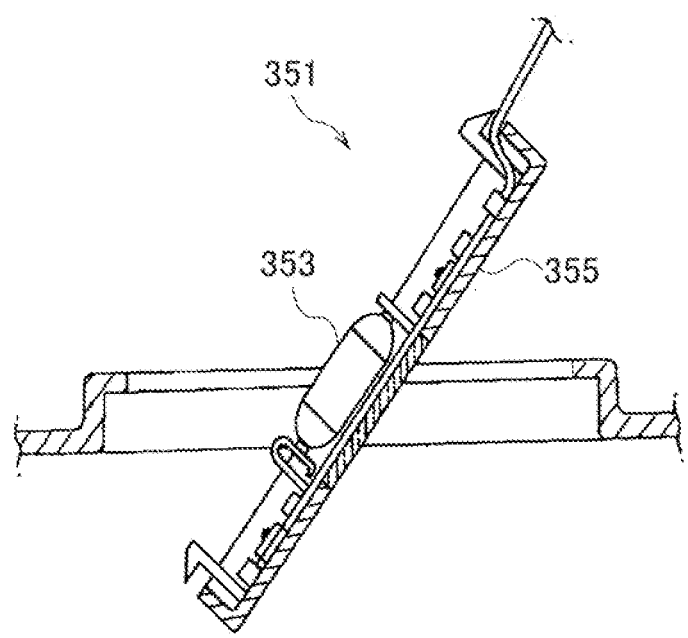
FIG. 12B is a diagram illustrating an illumination lamp according to the comparative example.

However, as illustrated in FIGS. 12A and 12B, in the case of the illumination lamp 351 according to the comparative example, because the function part 353 and the design part 355 are formed so as to be extremely difficult to separate, maintenance is difficult to perform, thus making changes in specification hard to deal with.

Note that the foregoing structure for fixing the illumination lamp 1 to the plate-like member 15 may be grasped as being a fall prevention structure for the illumination lamp.

Although the present embodiment has been described hereinabove, the present embodiment is not limited to or by such embodiments, rather, various modifications can be made within the spirit of the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A frame-like body of an illumination lamp, the frame-like body comprising:
   a first engagement part that is provided at a first end and that engages with a plate-like member having a through-hole, a first edge portion of the through-hole being received in the first engagement part; and
   a second engagement part that is provided at a second end and that engages with the plate-like member, a second edge portion of the through-hole being received in the second engagement part, said second engagement part including an arm portion having elasticity allowing the arm portion to be deformed and passed through the through-hole when securing the second engagement part to the second edge portion and to create a snap-fit connection of the second edge portion;
   wherein the first engagement part is configured comprising:
   a first engagement-part first contact portion that protrudes from a first end, which is one end of a frame-like body main-body portion and that makes contact with a first surface of the plate-like member; and
   a first engagement-part second contact portion that protrudes farther from the first end than the first engagement-part first contact portion in a longitudinal direction of the frame-like body and the plate-like member and that makes contact with a second surface of the plate-like member.

2. The frame-like body of an illumination lamp according to claim 1,
   wherein a value of a distance between the first engagement-part first contact portion and the first engagement-part second contact portion is a constant value at a proximal end of the first engagement-part first contact portion, and wherein, at a distal end of the first engagement-part first contact portion, the value gradually increases as the separation increases in a direction in which the first engagement-part first contact portion protrudes from the frame-like body main-body portion.

3. A frame-like body of an illumination lamp, the frame-like body comprising:
- a first engagement part that is provided at a first end and that engages with a plate-like member having a through-hole, a first edge portion of the through-hole being received in the first engagement part; and
- a second engagement part that is provided at a second end and that engages with the plate-like member, a second edge portion of the through-hole being received in the second engagement part,
- wherein the second engagement part is configured comprising a snap-fit, and a second engagement-part first contact portion that makes contact with the first surface of the plate-like member, and
- wherein the snap-fit is configured comprising an arm part that has elasticity, and a second engagement-part second contact portion that is provided at a distal end of the arm part and that makes contact with the second surface of the plate-like member.

4. An illumination lamp, comprising:
- a function part that emits light; and
- a design part that is configured comprising the frame-like body of an illumination lamp according to claim 3, and a lens that is fixed to the frame-like body of the illumination lamp, the design part having the function part fixed thereto.

* * * * *